US012785595B2

(12) United States Patent
Kato

(10) Patent No.: US 12,785,595 B2
(45) Date of Patent: Nov. 3, 2026

(54) MOTOR CONTROL DEVICE

(71) Applicant: CANON KABUSHIKI KAISHA, Tokyo (JP)

(72) Inventor: Atsushi Kato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 183 days.

(21) Appl. No.: 18/950,793

(22) Filed: Nov. 18, 2024

(65) Prior Publication Data

US 2025/0202388 A1 Jun. 19, 2025

(30) Foreign Application Priority Data

Dec. 15, 2023 (JP) ................................ 2023-212552

(51) Int. Cl.
*H02P 27/06* (2006.01)
*H02P 8/16* (2006.01)

(52) U.S. Cl.
CPC .................................... *H02P 8/16* (2013.01)

(58) Field of Classification Search
CPC ................................ H02P 8/16; H02P 27/06
USPC ...................................................... 318/696
See application file for complete search history.

(56) References Cited

U.S. PATENT DOCUMENTS

2008/0201041 A1* 8/2008 Jiang ...................... H02P 21/04 318/632
2011/0291600 A1* 12/2011 Takeuchi ................ H02P 27/08 318/400.14
2013/0328510 A1* 12/2013 Sato ......................... H02P 6/15 318/400.04
2014/0049200 A1* 2/2014 Ueyama .................... H02P 8/14 318/400.14
2015/0022139 A1* 1/2015 Yamanaka ................ H02P 8/14 318/696
2016/0285398 A1* 9/2016 Mizuo ....................... H02P 8/04
(Continued)

FOREIGN PATENT DOCUMENTS

JP 2011239483 A 11/2011
JP 2020198727 A 12/2020

*Primary Examiner* — Gabriel Agared
(74) *Attorney, Agent, or Firm* — Cowan, Liebowitz & Latman, P.C.

(57) ABSTRACT

In a motor control device, a storage unit configured to store a relation between an advance angle of a drive waveform for driving a motor and a speed at which the motor rotates, for each amplitude of the drive waveform, a speed detection unit configured to detect a speed of the motor, a position detection unit configured to detect a position at which the motor has rotated; and a control unit configured to control an advance angle of the drive waveform and an amplitude of the drive waveform based on a cycle or timing in which the position at which the motor has rotated is detected by the position detection unit, wherein the control unit increase a speed of the motor by executing a first control pattern in which the advance angle of the drive waveform is increased if the speed of the motor detected by the speed detection unit is lower than a target speed, and the amplitude of the drive waveform is increased if a condition that an amount of increase in the speed of the motor resulting from an increase in the advance angle of the drive waveform is equal to or less than a predetermined amount of increase is satisfied are provided.

5 Claims, 20 Drawing Sheets

(56) References Cited

U.S. PATENT DOCUMENTS

| | | | | |
|---|---|---|---|---|
| 2018/0069496 | A1* | 3/2018 | Mizuo | H02P 8/18 |
| 2021/0152055 | A1* | 5/2021 | Mizuo | G01D 5/2451 |

* cited by examiner

MOTOR CONTROL DEVICE

BACKGROUND OF THE INVENTION

Field of the Invention

The present invention relates to a motor control device.

Description of the Related Art

Although stepping motors are used in various fields and can easily execute a highly accurate positioning operation by open-loop control, there is a possibility of step-out due to a high load or high-speed rotation during the open-loop control.

As a method for solving this drawback, there is a method of controlling an advance angle of the drive waveform with respect to the rotation phase using a rotation phase signal of the motor acquired from a position sensor that is provided in the stepping motor.

According to this method, it is possible to bring out the rotation efficiency to the maximum by the optimal advance angle control, and it is possible to realize high speed and power saving. Additionally, Japanese Patent Application Laid-Open No. 2020-198727 proposes a method of determining a drive voltage by searching for a most efficient advance angle based on a change amount of the advance angle when the drive voltage is gradually decreased.

Additionally, Japanese Patent Laid-Open No. 2011-239483 proposes a method of decreasing a driving voltage if the driving efficiency obtained from the advance angle is equal to or higher than a threshold.

However, in the above-described methods, since it is necessary to secure a control margin of the advance angle taking into consideration mechanical or electrical variations, load fluctuations, and the like of the stepping motor, an efficient advance angle region cannot be used in some cases.

In the technique disclosed in Japanese Patent Application Laid-Open No. 2020-198727, although the advance angle of the maximum efficiency can be searched, it is necessary to provide a time period for searching the advance angle of the maximum efficiency, and it may not be possible to immediately respond to a change in the characteristics of the motor.

In the technique disclosed in Japanese Patent Application Laid-Open No. 2011-239483, although an advance angle having a certain degree of efficiency can be obtained, an advance angle having the maximum efficiency may not be obtained.

SUMMARY OF THE INVENTION

A motor control device according to one aspect of the present invention comprising: a storage unit configured to store a relation between an advance angle of a drive waveform for driving a motor and a speed at which the motor rotates, for each amplitude of the drive waveform; a speed detection unit configured to detect a speed of the motor; a position detection unit configured to detect a position at which the motor has rotated; and a control unit configured to control an advance angle of the drive waveform and an amplitude of the drive waveform based on a cycle or timing in which the position at which the motor has rotated is detected by the position detection unit, wherein the control unit increase a speed of the motor by executing a first control pattern in which the advance angle of the drive waveform is increased if the speed of the motor detected by the speed detection unit is lower than a target speed, and the amplitude of the drive waveform is increased if a condition that an amount of increase in the speed of the motor resulting from an increase in the advance angle of the drive waveform is equal to or less than a predetermined amount of increase is satisfied.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

Figure 1A:
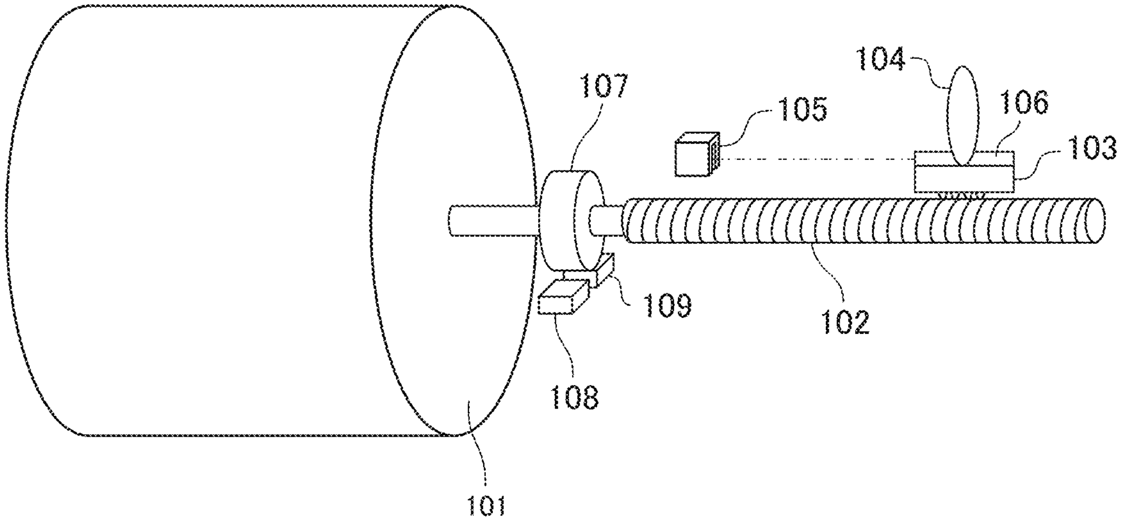
FIG. 1A and FIG. 1B are diagrams showing an example of a configuration of a stepper motor unit.

An outline of a configuration of a motor unit according to the present invention will be explained with reference to FIG. 1. FIG. 1 is a diagram showing an example of a configuration of a stepping motor unit. FIG. 1A shows a stepping motor 101, a rotation shaft 102, a rack 103, a moving member 104, a photo interrupter 105, a light shielding plate 106, a rotation phase detection magnet 107, a Hall sensor 108, and a Hall sensor 109.

The rotation shaft 102 is a lead screw and rotates together with the rotor of the stepping motor 101. The rack 103 is engaged with the lead screw of the rotation shaft 102 and moves in a direction parallel to the axis of the rotating shaft 102 by the rotation of the rotating shaft 102.

The moving member 104 is connected to the rack 103 and moves in a direction parallel to the axis of the rotation shaft 102 together with the rack 103. Note that, in the explanation below, a case where the moving member 104 is a lens will be explained as an example.

The photo interrupter (PI) 105 includes a light emitting unit that outputs light and a light receiving unit that receives the light. The light shielding plate 106 is connected to the rack 103 and moves in a direction parallel to the axis of the rotation shaft 102 together with the rack 103.

If the light shielding plate 106 moves between the light emitting unit and the light receiving unit according to the movement of the rack 103 and the light output by the light emitting unit is not incident on the light receiving unit, the photo interrupter 105 is switched from a state of detecting a high signal to a state of detecting a low signal. The position of the rack 103 when such switching of the state occurs is set as a reference position.

The rotational phase detection magnet 107 is a cylindrical permanent magnet attached to the rotation shaft 102. The rotational phase detection magnet 107 detects the rotational phase of the stepping motor 101 in cooperation with the Hall sensor 108 and the Hall sensor 109.

In the explanation below, the Hall sensor 108 may be denoted as "Hall-Ch0", and the Hall sensor 109 may be denoted as "Hall-Ch1".

Figure 1B:
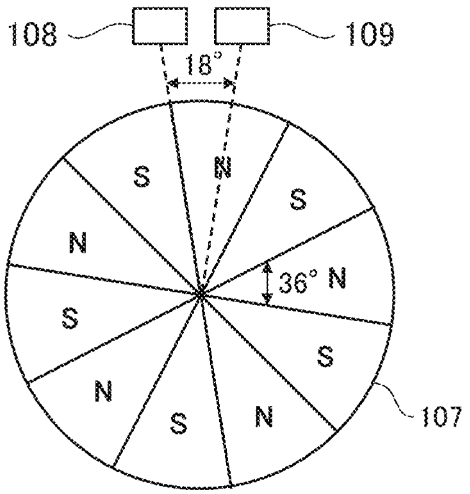

FIG. 1B shows the arrangement of each pole of the rotation phase detection magnet 107, the Hall sensor 108, and the Hall sensor 109. The rotation phase detection magnet 107 has ten poles corresponding to the number of poles of the stepping motor 101.

Each pole of the rotation phase detection magnet 107 is evenly arranged at a mechanical angle of 36 degrees. The Hall sensor 108 and the Hall sensor 109 are arranged on an extension line of a mechanical angle of 18 degrees of the rotation phase detection magnet 107.

By this arrangement, the Hall sensor 108 and the Hall sensor 109 detect sine waves whose phases are shifted from each other by 90 degrees with the rotation of the stepping motor 101.

The stepping motor unit as shown in FIG. 1 may include a speed detection unit that detects a speed at which the stepping motor 101 rotates. For example, the speed detection unit detects a speed from the gradient of the amount of change in the rotation angle of the stepping motor 101 that has been acquired by the rotation angle detection unit.

Additionally, for example, the speed detection unit detects a speed from a cycle of a rotation detection pulse that has been acquired by a rotation pulse detection unit that generates a rotation pulse according to the rotation of the stepping motor 101.

Additionally, the rotation pulse detection unit generates a rotation detection pulse using, for example, a phase detection propeller attached to the rotation shaft 102 and a photo interrupter that detects the rotation of the phase detection propeller. Additionally, the phase detection propeller includes, for example, the same number of blades as the number of poles of the stepping motor 101.

Figure 2:
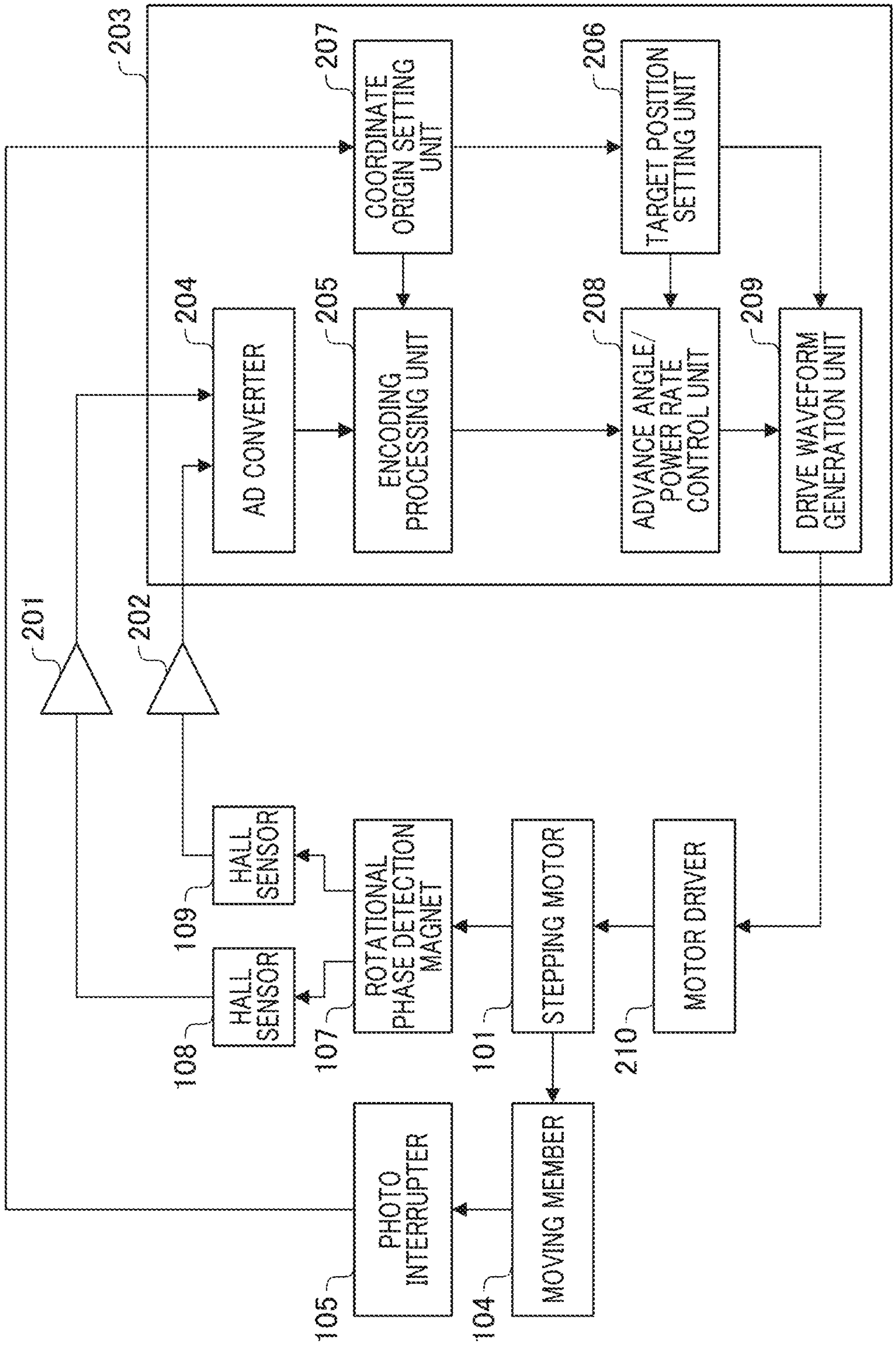
FIG. 2 is a diagram illustrating an example of a configuration of a system including an electric circuit that drives a stepping motor.

Next, a configuration of a system including an electric circuit that drives the stepping motor will be explained with reference to FIG. 2. FIG. 2 is a diagram illustrating an example of a configuration of a system including an electric circuit that drives the stepping motor.

FIG. 2 illustrates the stepping motor 101, the moving member 104, the photo interrupter 105, the rotation phase detection magnet 107, the Hall sensor 108, and the Hall sensor 109.

Additionally, FIG. 2 illustrates an amplifier circuit 201, an amplifier circuit 202, and a microcomputer 203. As illustrated in FIG. 2, the microcomputer 203 includes an AD converter 204, an encoding processing unit 205, a target position setting unit 206, a coordinate origin setting unit 207, an advance angle/power rate control unit 208, a drive waveform generation unit 209, and a motor driver 210.

The amplifier circuit 201 amplifies the Hall signal detected by the Hall sensor 108, that is, the Hall Ch0. The amplifier circuit 202 amplifies the Hall signal detected by the Hall sensor 109, that is, the Hall Ch1.

The AD converter 204 quantizes the Hall signal that has been amplified by the amplifier circuit 201 and the Hall signal that has been amplified by the amplifier circuit 202. The encoding processing unit 205 calculates a position detection counter by encoding the quantized Hall signal.

Note that, although in the present embodiment, the position detection counter calculation method using the Hall sensor is explained, the position detection counter calculation method is not limited thereto. The position detection counter may be calculated from a rotation detection pulse generated using a photo interrupter and a slit rotating plate, instead of the Hall sensor.

The target position setting unit 206 sets a target position of the lens. Specifically, the target position setting unit 206 generates a target position counter for controlling the lens at a target speed and a target position. The coordinate origin setting unit 207 sets the same coordinate origin for the position detection counter and the target position counter and aligns the coordinates of the position detection counter and the target position counter.

The advance angle/power rate control unit 208 controls the advance angle of the drive waveform and the amplitude of the drive waveform based on the cycle or the timing at which the position detection unit detects the position where the stepping motor 101 is rotated. Additionally, the advance angle/power rate control unit 208 is an example of a control unit.

The control unit increases the advance angle of the drive waveform if the speed of the stepping motor 101 detected by the speed detection unit is lower than the target speed. Then, the control unit increases the amplitude of the drive waveform if a condition that the amount of increase in the speed of the stepping motor 101 resulting from the increase in the advance angle of the drive waveform is equal to or less than a predetermined amount of increase is satisfied.

This series of control processes is a first control pattern. The control unit increases the speed of the stepping motor 101 according to the first control pattern.

Additionally, the control unit decreases the advance angle of the drive waveform if the speed of the motor detected by the speed detection unit is higher than the target speed. Then, the control unit decreases the amplitude of the drive waveform if the amount of decrease in the speed of the stepping motor 101 due to the decrease in the advance angle of the drive waveform is equal to or less than a predetermined amount of decrease. This series of control processes is a second control pattern. The control unit decreases the speed of the stepping motor 101 by the second control pattern.

Additionally, the speed detection unit described above may detect the speed of the stepping motor 101 after the first control pattern is executed. In this case, the control unit executes the first control pattern again if the speed of the stepping motor 101 after the first control pattern is executed is less than a target speed.

Additionally, the control unit increases the amplitude of the driving waveform if the speed of the motor detected by the speed detection unit is lower than the target speed, and the speed of the motor does not increase even though the advance angle of the driving waveform is increased, and rather, the speed of the motor decreases resulting from the increase in the advance angle of the driving waveform.

Figure 5:
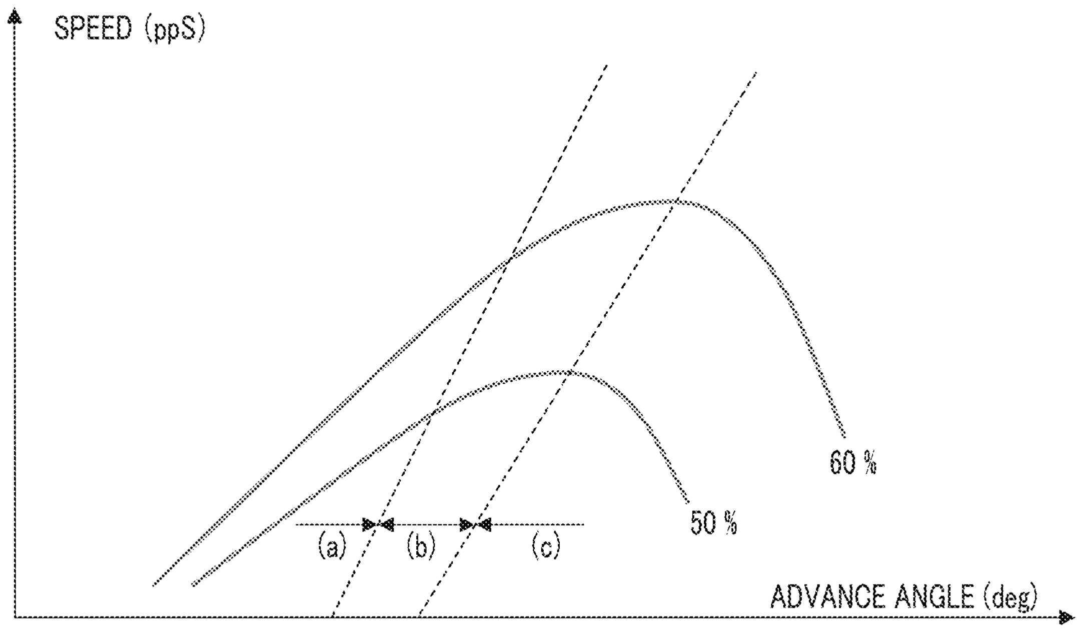
FIG. 5 is a diagram illustrating an example of a relation between an advance angle of a drive waveform for driving a stepping motor and a speed of the stepping motor.

With reference to FIG. 5, this state means that it can be determined that the motor speed is decreased since the advance angle has exceeded the top of the hill-shaped portion having a low amplitude and entered the region (c), and therefore the locus (relation) is changed to a high-amplitude locus (relation) in which the top is shifted further to the right.

Additionally, if the condition is satisfied and the difference between the speed of the motor and the target speed is equal to or greater than a predetermined speed, the control unit may increase the amount of increase in the amplitude of the drive waveform more than a case where the condition is satisfied and the difference is less than the predetermined speed. Examples of the control unit will be described below as appropriate.

The advance angle/power rate control unit 208 sets a target advance angle and adds the target advance angle to the position detection counter to generate a drive counter. Additionally, the advance angle/power rate control unit 208 sets a power rate to execute feedback control on the advance angle of the drive waveform and the amplitude of the drive waveform so that the lens moves following the target position counter.

The drive waveform generation unit 209 performs SIN/COS conversion on the drive counter, and further adjusts the amplitude of the drive waveform according to the power rate to generate a two phase drive waveforms.

However, since the advance angle/power rate control unit 208 cannot execute the feedback control until the coordinate origin is set by the coordinate origin setting unit 207, the advance angle/power rate control unit 208 executes the open control until the coordinate origin is set by the coordinate origin setting unit 207.

In a case in which the open control is executed, the advance angle/power rate control unit 208 sets the target position counter obtained from the target position setting unit 206 as the drive counter, sets the power rate for the open control, and controls the drive waveform.

The motor driver 210 converts the drive waveform generated by the drive waveform generation unit 209 into a motor drive signal, and supplies the motor drive signal to the stepping motor 101. Note that, although the drive waveform is generally converted into a pulse width modulation (PWM) signal and supplied to the motor driver 210, the waveform may be supplied after AD conversion processing, or may be supplied as drive waveform information from a communication port.

<Encoding Processing of Hall Signal>

Next, details of the processing executed by the encoding processing unit 205 will be explained with reference to FIG. 3.

Note that in the explanation of the processing, it is assumed that the number of poles of the stepping motor 101 is 10 according to the configuration as shown in FIG. 1B, and the number of poles of the rotation phase detection magnet 107 is also 10 according to the number of poles of the stepping motor.

Figure 3:
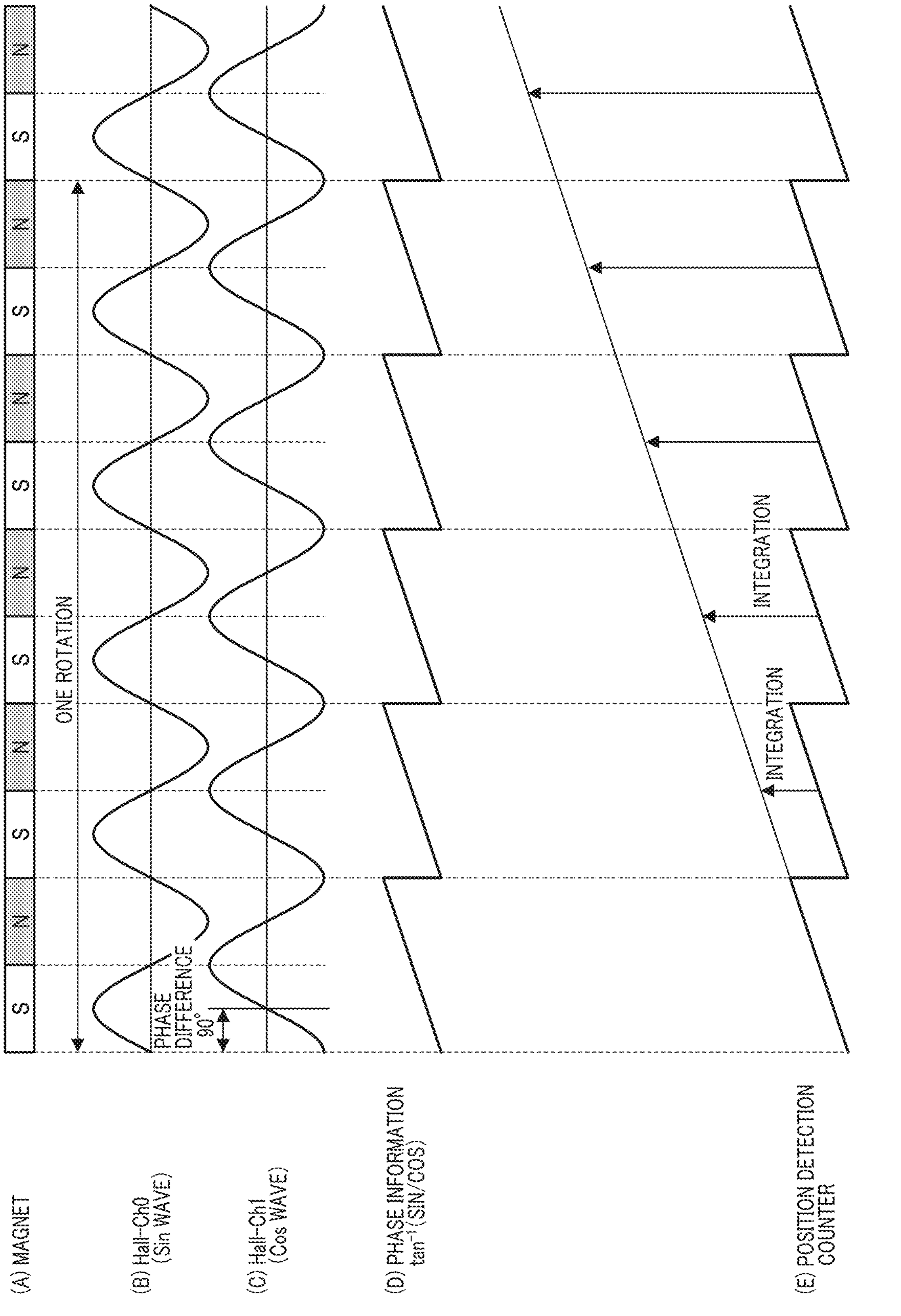
FIG. 3 is a diagram showing an example of a pole of a magnet for rotational phase detection, a waveform of a Hall signal, phase information, and a position detection counter.

FIG. 3 is a diagram illustrating an example of a pole of a magnet for rotational phase detection, a waveform of a Hall signal, phase information, and a position detection counter. FIG. 3A illustrates a pole of the rotation phase detection magnet 107.

FIG. 3B and FIG. 3C show the waveforms of the Hall signals obtained at each of rotational phases of the stepping motor 101. Additionally, the arrangement as shown in FIG. 1B is adopted such that the phase of the Hall signal as shown in FIG. 3B and the phase of the Hall signal as shown in FIG. 3C are shifted by 90 degrees.

Since the phase of the Hall signal as shown in FIG. 3B and the phase of the Hall signal as shown in FIG. 3C are shifted from each other by 90 degrees, the Hall signal as shown in FIG. 3B and the Hall signal shown in FIG. 3C have a relation of Sin and Cos.

The encoding processing unit 205 executes an inverse tangent operation ($\tan^{-1}$ (Sin/Cos)) based on the Hall signal of Sin and the Hall signal of Cos quantized by the AD converter 204, and calculates phase information from 0 degrees to 360 degrees. FIG. 3D illustrates the phase information calculated by the encoding processing unit 205.

The encoding processing unit 205 calculates a motor rotation amount by performing integration processing on the phase information. The motor rotation amount is information that can be converted into position information of the lens by being multiplied by a screw pitch of a lead screw of the rotation shaft 102.

Accordingly, the rotation amount information of the motor is treated as a position detection counter of the lens. FIG. 3E illustrates the position detection counter calculated by the encoding processing unit 205. Note that although in the above explanation, a case where the phase information is information from 0 degrees to 360 degrees has been explained as an example, the present invention is not limited thereto since the phase information is determined by the resolution of the position detection counter.

Next, the processing executed by the coordinate origin setting unit 207 will be explained in detail. When the power is turned on, the microcomputer 203 initially executes a sequence for setting the coordinate origin of the lens. Specifically, the microcomputer 203 moves the lens, searches for the position of the lens at which the signal detected by the photo interrupter 105 is switched from high to low, and sets the position of the lens at which the signal is switched from high to low as the coordinate origin.

Then, the microcomputer 203 initializes the position detection counter and the target position counter to predetermined values. Thereby, the microcomputer 203 can align the coordinates of both and control the position of the lens.

<Generation of Drive Waveform>

Figure 4:
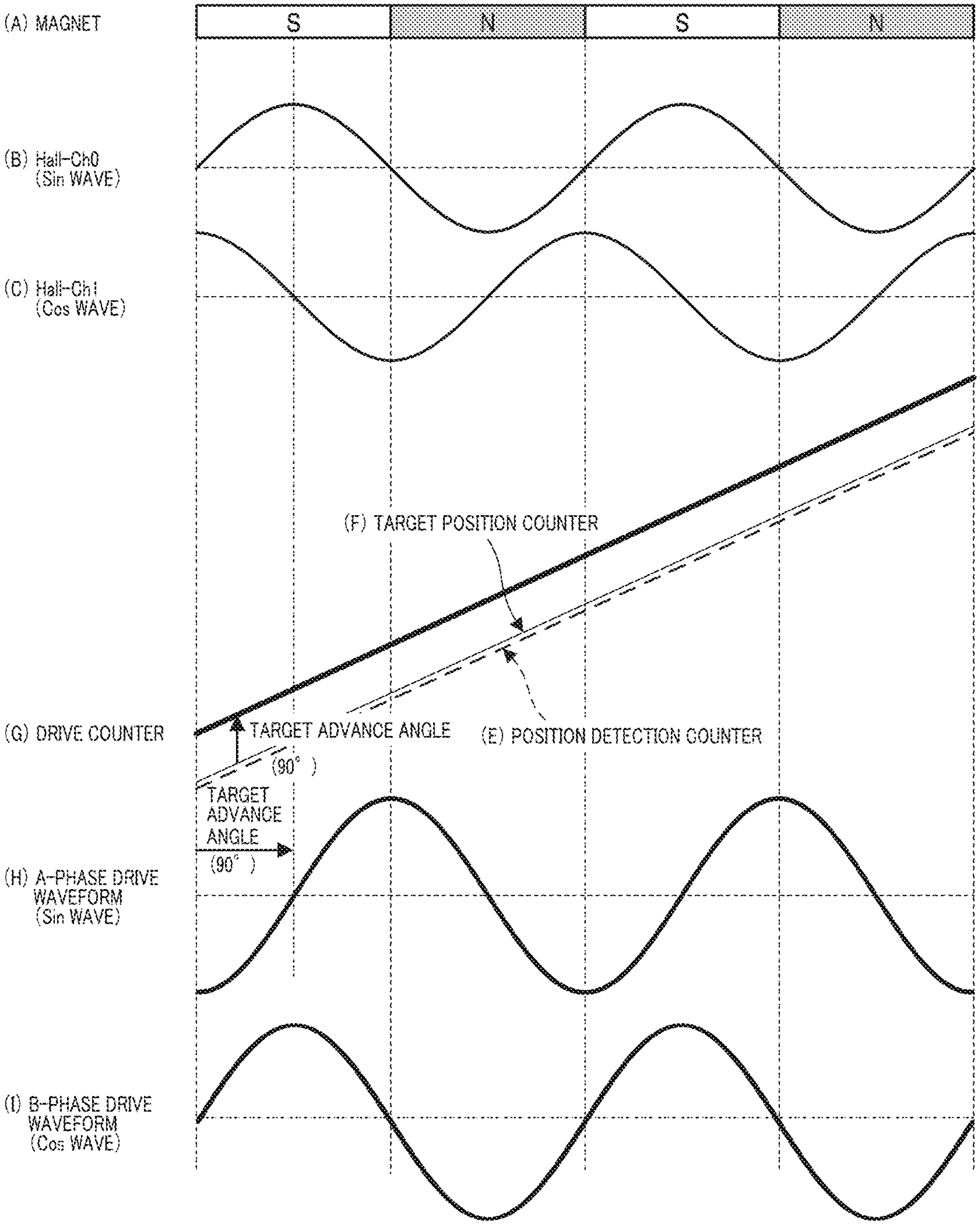
FIG. 4 is a diagram showing an example of a pole of a magnet for rotational phase detection, a waveform of a Hall signal, a position detection counter, a target position counter, a drive counter, an A-phase drive waveform, and a B-phase drive waveform.

Next, the processing of the advance angle control will be explained in detail with reference to FIG. 4. FIG. 4 is a diagram illustrating an example of a pole of a magnet for rotational phase detection, a waveform of a Hall signal, a position detection counter, a target position counter, a drive counter, an A-phase drive waveform, and a B-phase drive waveform.

FIG. 4A, FIG. 4B, FIG. 4C, and FIG. 4E are respectively the same as FIG. 3A, FIG. 3B, FIG. 3C, and FIG. 3E. FIG. 4F shows a target position counter.

As described above, the target advance angle and the power rate are calculated so that the position detection counter as shown in FIG. 4E follows the target position counter as shown in FIG. 4F. Note that, here, a case where the target advance angle is 90 degrees will be explained as an example.

The advance angle/power rate control unit 208 generates the drive counter as shown in FIG. 4G by superimposing the target advance angle on the position detection counter. This drive counter is angle information generated by superimposing the target advance angle on the position detection counter as shown in FIG. 4E.

The position detection counter is a counter obtained by integrating the phase information from 0 degrees to 360 degrees. Similarly, the drive counter also has the phase information from 0 degrees to 360 degrees at the lower end of the counter.

Accordingly, the drive waveform generation unit 209 generates two phase drive waveforms whose phase is shifted by the advance angle with respect to the rotation phase of the stepping motor 101 by performing Sin conversion and Cos conversion on the drive counter.

These two phase drive waveforms are the A-phase drive waveform as shown in FIG. 4H and the B-phase drive waveform as shown in FIG. 4I. Additionally, the power rate of the drive waveform is set so as to obtain the target amplitude, and the drive waveform is output to the motor driver 210.

Note that, in this case, the phase information has been explained as information from 0 degrees to 360 degrees. However, the phase information is determined by the resolution of the position detection counter as shown in FIG. 4E and is not limited to the above description.

Note that the rotation phase detection magnet 107, the Hall sensor 108, the Hall sensor 109, the amplifier circuit 201, and the amplifier circuit 202 are an example of a position detection unit that detects a position at which the stepping motor 101 has rotated.

<Calculation Processing of Advance Angle/Power Rate>

Next, a process executed by the advance angle/power rate control unit 208 will be explained with reference to FIG. 5 to FIG. 8.

FIG. 5 is a diagram illustrating an example of a relation between an advance angle of a drive waveform for driving the stepping motor and a speed of the stepping motor. FIG. 5 illustrates a relation between them if the power rate is 50% and a relation between them if the power rate is 60%.

The power rate is for adjusting the amplitude of the drive waveform. For example, if the power rate is 60%, the amplitude of the drive waveform is suppressed to 60%. The information indicating the relation as illustrated in FIG. 5 is stored for each amplitude of the drive waveform by, for example, the storage unit.

As shown in FIG. 5, in the region (a), the speed of the stepping motor 101 increases in proportion to an increase in the advance angle of the drive waveform. However, when the advance angle of the drive waveform further increases and enters the region (b), the amount of increase in the speed of the stepping motor 101 resulting from the increase in the advance angle of the drive waveform gradually decreases.

Then, when the advance angle of the drive waveform further increases, exceeds the saturation point, and enters the region (c), the speed of the stepping motor 101 decreases. Additionally, as the power rate increases, the gradient of the advance angle-speed in the region (a) increases, and the advance angle of the saturation point increases.

As described above, in the region (a), the advance angle and the speed are in a proportional relation. That is, in the region (a), the relation between the advance angle and the speed is expressed by Formula (1) below.

$$\text{Speed} = \text{advance angle} \times \gamma + \beta \qquad \text{Formula (1)}$$

γ: gradient, β: offset

Accordingly, the relation between the advance angle and the speed is measured in advance, and the gradient γ and the offset β of Formula (1) and the effective area W in which Formula (1) is effective are stored as an advance angle-speed table based on the measurement data.

Note that it is assumed that a plurality of advance angle-speed tables are stored for each power rate and can be selected according to the target speed. Additionally, in this case, it is assumed that the advance angle-speed table having a lower power rate is preferentially selected.

Figure 6:
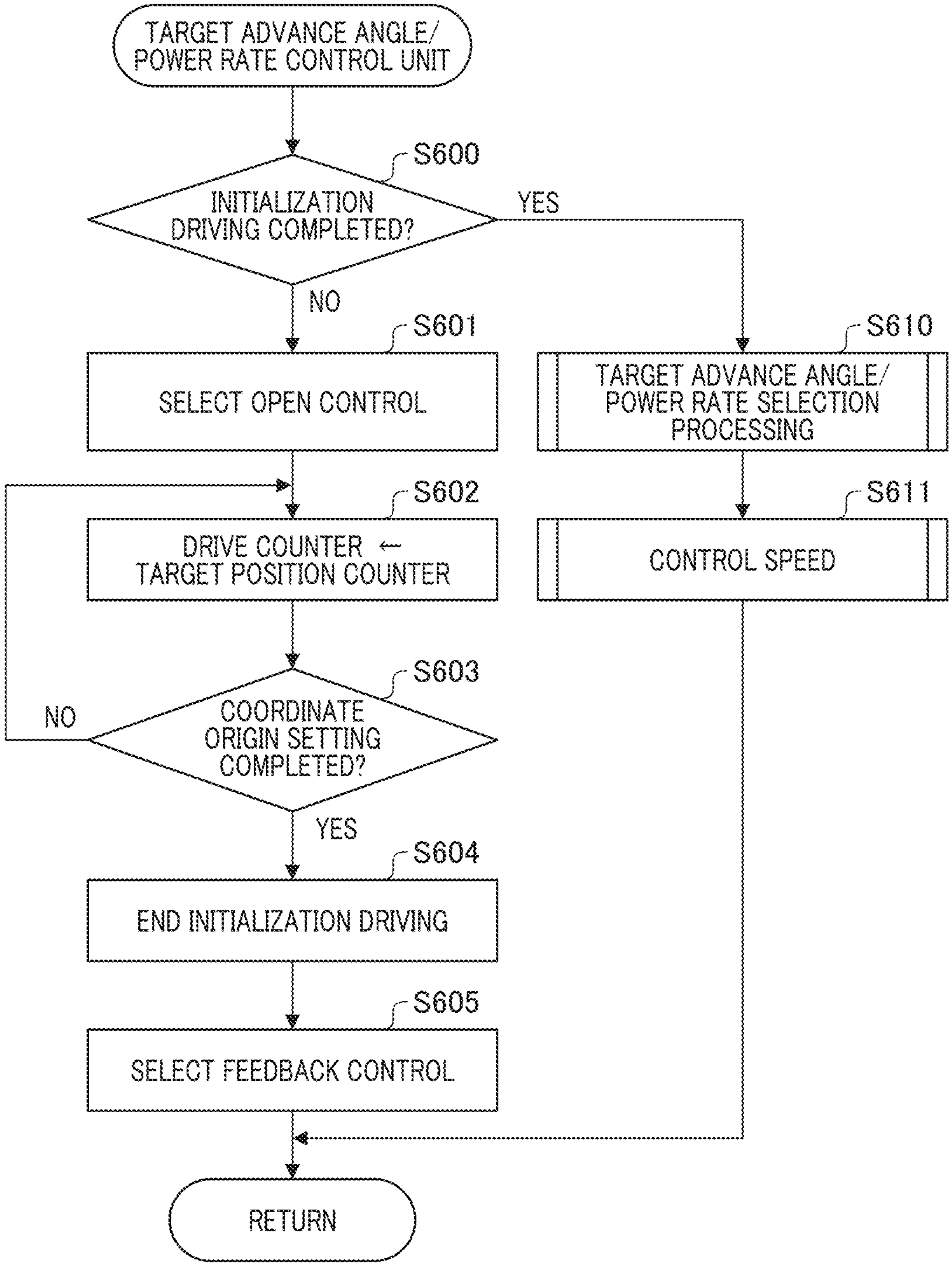
FIG. 6 is a flowchart illustrating an example of processing executed by an advance angle/power rate control unit.

Next, an example of process executed by the advance angle/power rate control unit 208 will be explained with reference to FIG. 6. FIG. 6 is a flowchart illustrating an example of process executed by the advance angle/power rate control unit.

As explained with reference to FIG. 2, in the position detection counter and the target position counter, the same coordinate origin is set by the coordinate origin setting unit 207, and the coordinates are aligned. However, as described above, the advance angle/power rate control unit 208 cannot execute the feedback control until the coordinate origin is set by the coordinate origin setting unit 207.

Accordingly, the open control is executed until the coordinate origin is set by the coordinate origin setting unit 207. Then, the advance angle/power rate control unit 208 executes the open control during the initialization driving, and switches the open control to the feedback control from the time point when the initialization driving is completed.

In step S600, the advance angle/power rate control unit 208 executes the determination of whether or not to switch the control method. The advance angle/power rate control unit 208 advances the process to step S601 until switching the control method to the feedback control is determined after the initializing driving is completed in step S600.

In step S601, the advance angle/power rate control unit 208 selects the open control. In step S602, the advance angle/power rate control unit 208 sets the target position counter as the drive counter.

Then, in step S603, the advance angle/power rate control unit 208 repeats the processes of step S602 and step S603 until it is determined that the setting of the coordinate origin by the coordinate origin setting unit 207 is completed.

After the setting of the coordinate origin is completed, the advance angle/power rate control unit 208 advances the process to step S604 and completes the initialization driving. Then, the advance angle/power rate control unit 208 advances the process to step S605 and switches the control method to the feedback control.

Thereafter, the advance angle/power rate control unit 208 advances the process to step S600 via step S610 to execute the target advance angle/power rate selection processing, and advances the process to step S611 to execute the speed control.

Figure 7:
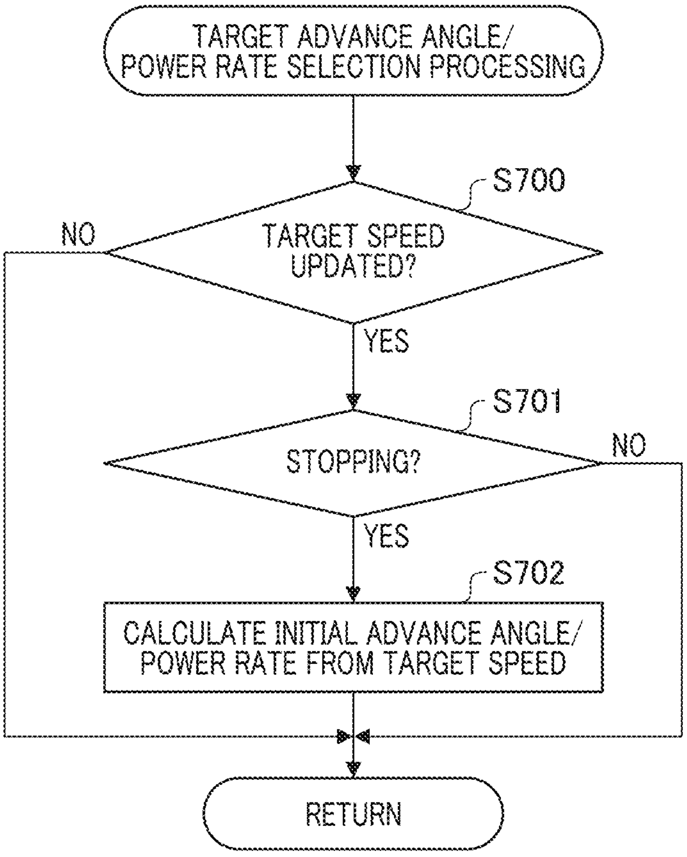
FIG. 7 is a flowchart illustrating an example of the target advance angle/power rate selection processing.

Next, the target advance angle/power rate selection processing will be explained with reference to FIG. 7. FIG. 7 is a flowchart illustrating an example of the target advance angle/power rate selection processing.

In step S700, the advance angle/power rate control unit 208 determines whether or not the target speed has been updated. In step S700, if the advance angle/power rate control unit 208 determines that the target speed has been updated, it advances the process to step S701 and, in step S701, it determines whether or not the open control is stopping.

Then, if the advance angle/power rate control unit 208 determines that the open control is stopping in step S701, it advances the process to step S702, and calculates the initial advance angle and the power rate based on the target speed. Note that the target speed is calculated by Formula (2) below including a deviation amount (l) between the current position and the target position and a target time (t) required to move to the target position.

$$\text{Target speed} = \text{deviation amount } (l)/\text{target time } (y) \qquad \text{Formula (2)}$$

Figure 8:
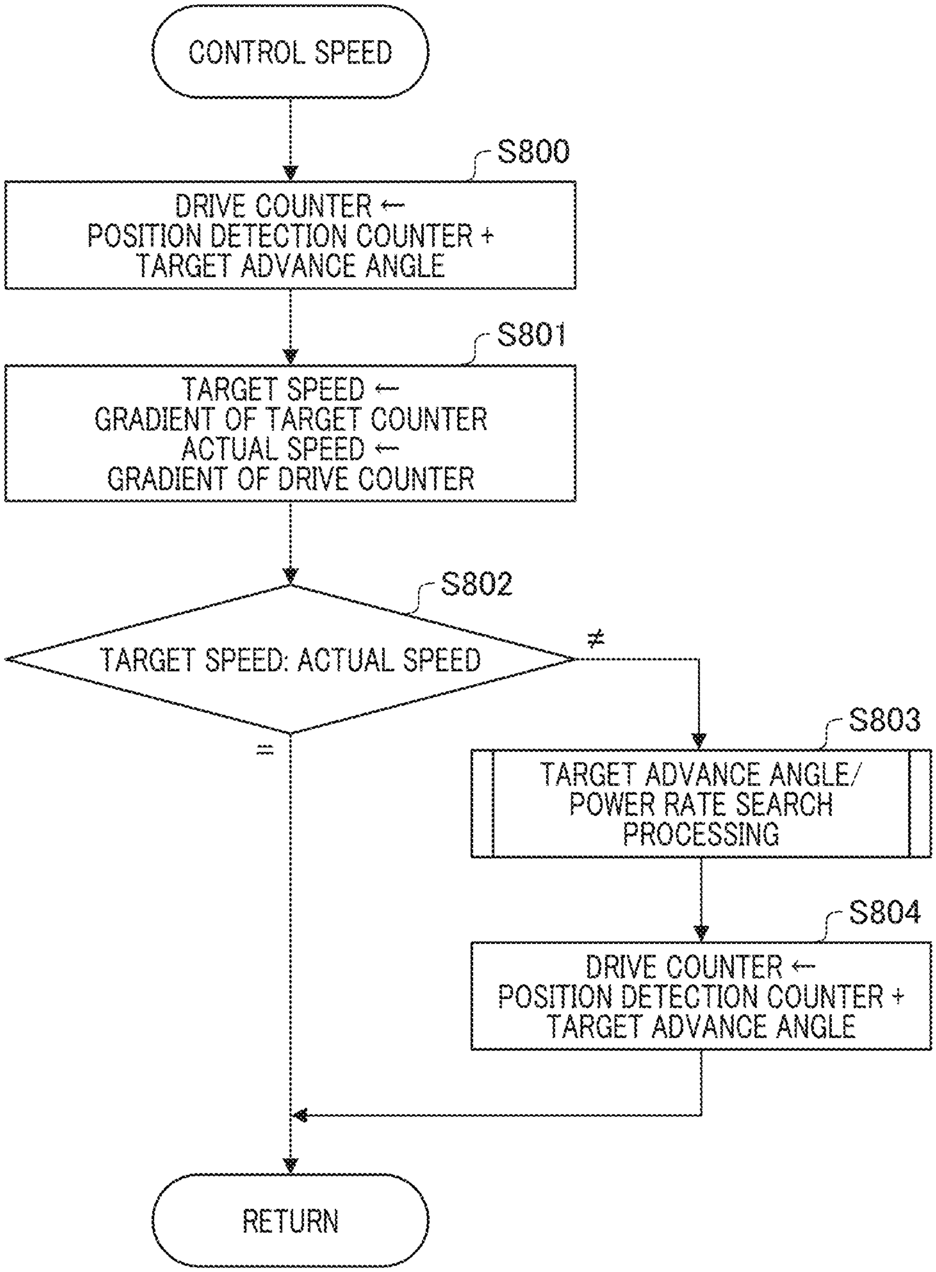
FIG. 8 is a flowchart illustrating an example of speed control.

Next, the speed control executed by the advance angle/power rate control unit 208 will be explained with reference to FIG. 8. FIG. 8 is a flowchart illustrating an example of the speed control.

In the speed control, the advance angle/power rate control unit 208 executes feedback control of the advance angle and the power rate of the drive waveform using the target advance angle and the power rate selected by the target advance angle/power rate selection processing.

In step S800, the advance angle/power rate control unit 208 208 generates a drive counter obtained by adding the target advance angle to the position detection counter. Next, in step S801, the advance angle/power rate control unit 208 calculates a target speed and an actual speed from each of the gradient of the target position counter and the gradient of the position detection counter.

In step S802, the advance angle/power rate control unit 208 compares the calculated target speed and the actual speed, and if the advance angle/power rate control unit 208 determines that there is a deviation between the calculated target speed and the actual speed, it advances the process to step S803. In step S803, the advance angle/power rate control unit 208 executes the advance angle/power rate search processing, and calculates the target advance angle and power rate. In step S804, the advance angle/power rate control unit 208 generates a drive counter by superimposing the target advance angle on the position detection counter.

First Embodiment

In the first embodiment, an example of the advance angle/power rate search processing, which is one of the features of the present invention, that is, an example of step S803 described above will be explained with reference to FIG. 9 to FIG. 16.

Specifically, the target advance angle/power rate search processing in a case in which the target speed is set in the acceleration direction will be explained for each target speed. Note that in the explanation of the first embodiment, a case where the initial power rate is 50% will be explained as an example.

Figure 9:
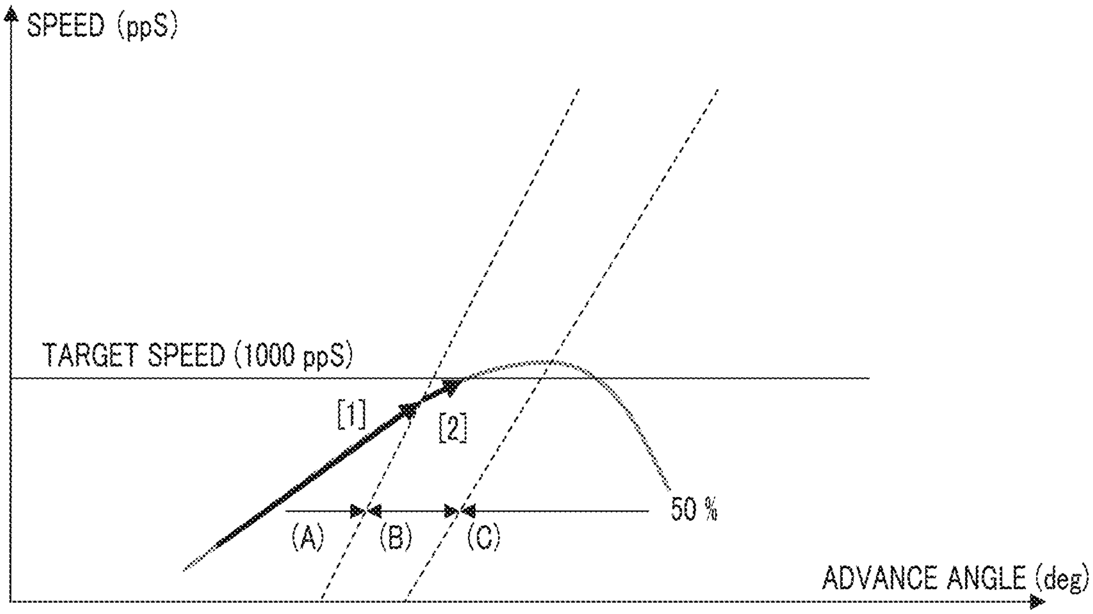
FIG. 9 is a diagram for explaining an example of the target advance angle/power rate search processing in a case in which a target speed is set in an acceleration direction and the target speed is 1000 ppS.
Figure 10:
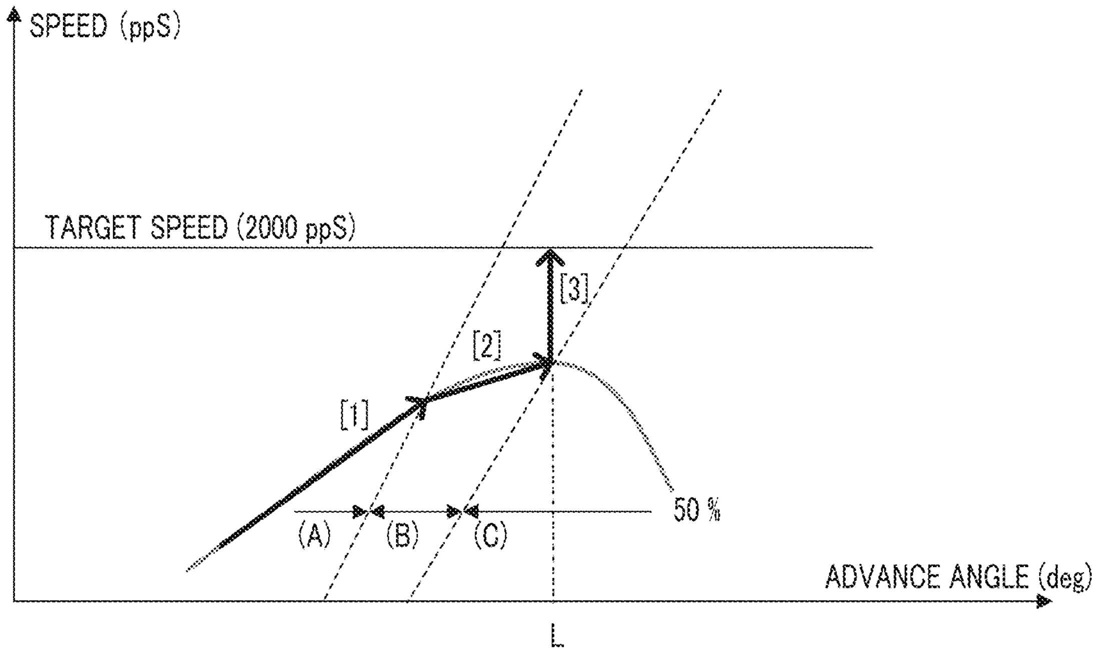
FIG. 10 is a diagram for explaining an example of the target advance angle/power rate search processing in a case in which the target speed is set in an acceleration direction and the target speed is 2000 ppS.

FIG. 9 is a diagram for explaining an example of the target advance angle/power rate search processing in a case in which the target speed is set in the acceleration direction and the target speed is 1000 ppS. FIG. 10 is a diagram for explaining an example of the target advance angle/power rate search processing in a case in which the target speed is set in the acceleration direction and the target speed is 2000 ppS.

Figure 11:
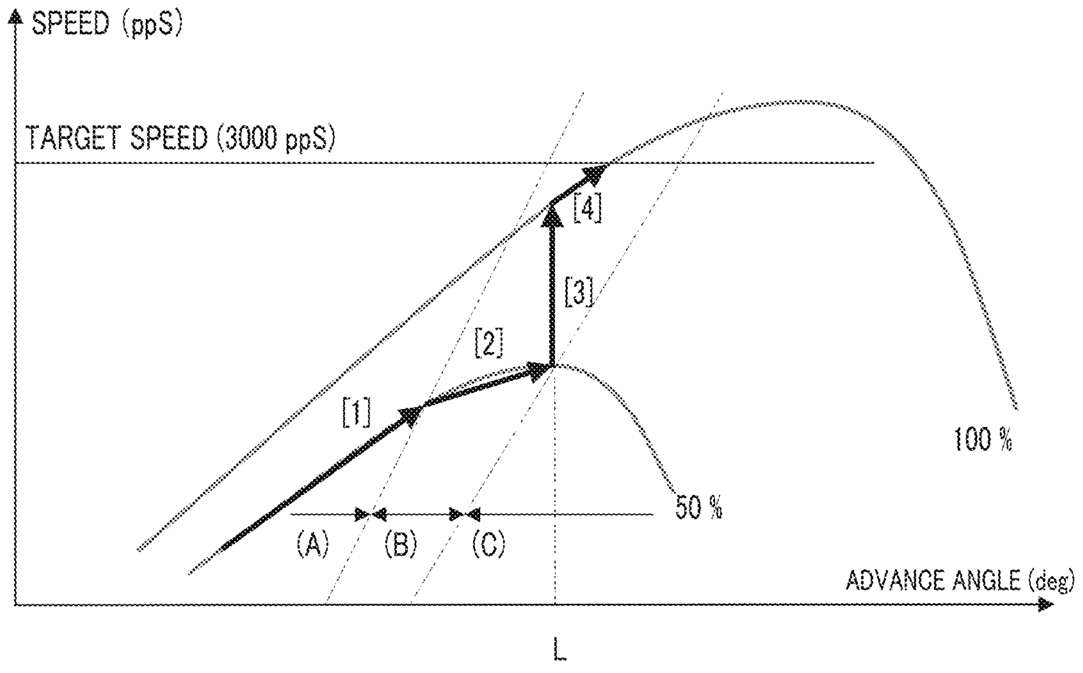
FIG. 11 is a diagram for explaining an example of the target advance angle/power rate search processing in a case in which the target speed is set in an acceleration direction and the target speed is 3000 ppS.

FIG. 11 is a diagram for explaining an example of the target advance angle/power rate search processing in a case in which the target speed is set in the acceleration direction and the target speed is 3000 ppS. Each of FIG. 9, FIG. 10, and FIG. 11 illustrates an example of the relation between the advance angle of the drive waveform for driving the stepping motor 101 and the speed at which the stepping motor 101 rotates. Additionally, the information indicating the relation is stored by, for example, the storage unit for each amplitude of the drive waveform.

As illustrated in FIG. 9, FIG. 10, and FIG. 11, even if the target speed is any of 1000 ppS, 2000 ppS, and 3000 ppS, the relation between the advance angle and the speed behaves in the same manner. Specifically, in any of these three cases, the speed is directly proportional to the advance angle in the region (A), and in the region (B), the speed change rate, which is the ratio of the increase amount of the speed to the increase amount of the advance angle, approaches zero from a positive value as long as the advance angle does not reach the saturation point.

For example, if the target speed is a 1000 ppS, the target speed is not reached even when the advance angle is increased in the region (A) as indicated by [1] in FIG. 9, and the target speed is reached when the advance angle is increased such that the speed change rate becomes equal to or less than a predetermined increase amount in the region (B) as indicated by [2] in FIG. 9.

Additionally, for example, if the target speed is 2000 ppS, the target speed is not reached even when the advance angle is increased as indicated by [1] and [2] in FIG. 10, and an advance angle L that gives a saturation point is reached. Then, in this case, the target speed is reached when the power rate is increased, as indicated by [3] in FIG. 10.

Additionally, for example, if the target speed is 3000 ppS, the target speed is not reached even when the advance angle is increased as indicated by [1] and [2] in FIG. 11, and the advance angle L that gives a saturation point is reached. Next, as indicated by [3] in FIG. 11, the target speed is not reached even if the power rate is increased.

In this case, as illustrated by [4] in FIG. 11, when the power rate is increased to 100% and the advance angle is increased so that the speed change rate becomes equal to or less than a predetermined increase amount, the target speed is reached.

Figure 12:
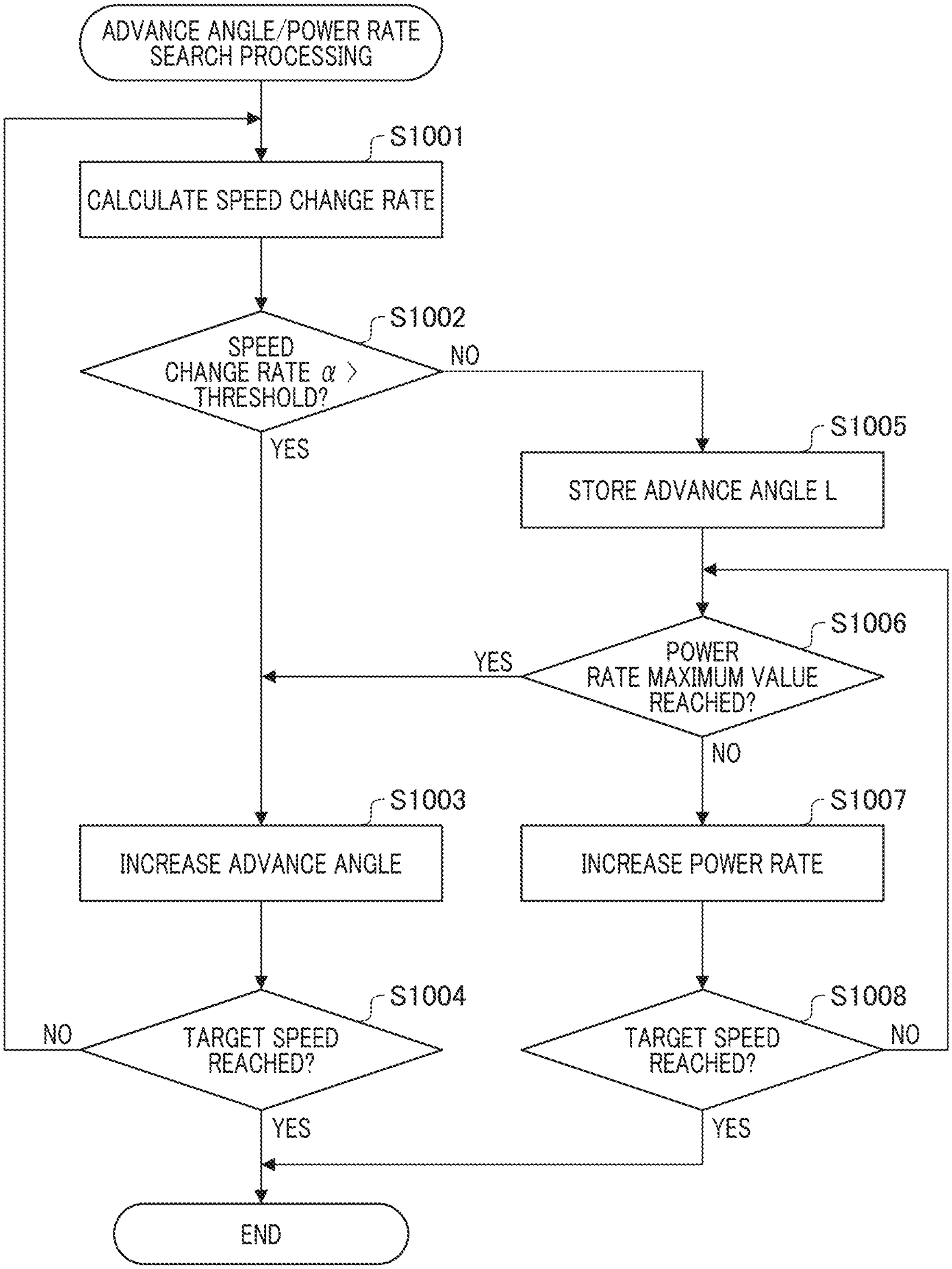
FIG. 12 is a flowchart for explaining an example of the advance angle/power rate search processing explained with reference to FIG. 9 to FIG. 11.

Next, details of the advance angle/power rate search processing explained with reference to FIG. 9 to FIG. 11, that is, the detail of step S803 descried above will be explained with reference to FIG. 12. FIG. 12 is a flowchart for explaining an example of the advance angle/power rate search processing explained with reference to FIG. 9 to FIG. 11.

In step S1001, the advance angle/power rate control unit 208 calculates a speed changing rate a using Formula (3) below.

$$\text{Speed change rate } \alpha = \text{speed change amount/advance angle change amount} \quad \text{Formula (3)}$$

In step S1002, the advance angle/power rate control unit 208 compares the calculated speed changing rate a and a threshold. The threshold is a predetermined amount of increase in the speed resulting from the increase in the advance angle. If the advance angle/power rate control unit 208 determines that the calculated speed changing rate a is greater than the threshold, it advances the process to step S1003.

In step S1003, the advance angle/power rate control unit 208 executes the adjustment of the speed based on the advance angle. That is, the advance angle/power rate control unit 208 accelerates and drives the stepping motor 101 while updating the advance angle to an advance angle larger than the previous advance angle.

Additionally, the advance angle/power rate control unit 208 may adopt a predetermined value as the advance angle change amount, or may calculate the advance angle change amount by Formula (4) below including the target speed and the current speed.

$$\text{Advance angle change amount} = (\text{target speed} - \text{current speed}) \times \text{gain} \quad \text{Formula (4)}$$

Here, "gain" included in Formula (4) is a value set from the relation of the change amount of the speed with respect to the operation amount of the advance angle measured in advance.

In step S1004, the advance angle/power rate control unit 208 determines whether or not the speed has reached the target speed. In step S1004, if the advance angle/power rate control unit 208 determines that the speed has not reached the target speed, it returns the process to step S1001.

When the processes from step S1001 to step S1004 are executed at least once and the stepping motor 101 is accelerated, it is determined in step S1002 that the speed change rate a becomes larger than the threshold.

Next, the advance angle/power rate control unit 208 advances the process to step S1005, and in step S1005, the advance angle/power rate control unit 208 stores the advance angle L at the speed at the present time point. In step S1006, the advance angle/power rate control unit 208 determines whether or not the power rate has reached the maximum value.

In the present embodiment, it is assumed that the maximum value of the power rate is 100%. If the power rate has not reached the maximum value, in step S1007, the advance angle/power rate control unit 208 accelerates and drives the stepping motor 101 while updating the power rate to a power rate larger than the previous power rate.

The advance angle/power rate control unit 208 may adopt a predetermined value as the power rate change amount, or may calculate the power rate change amount by Formula (5) below including the target speed and the current speed.

$$\text{Power rate change amount} = (\text{target speed} - \text{current speed}) \times \text{gain}' \quad \text{Formula (5)}$$

Here, "gain" included in Formula (5) is a value set from the relation of the change amount of the speed with respect to the operation amount of the power rate measured in advance.

In step S1008, the advance angle/power rate control unit 208 determines whether or not the speed has reached the target speed. In step S1008, if the advance angle/power rate control unit 208 determines that the speed has not reached the target speed, it returns the process to step S1006.

In contrast, if the speed does not reach the target speed even when the power rate reaches 100% that is the maximum value, the advance angle/power rate control unit 208 returns the process to step S1003 again in a state where the power rate is the maximum value, and executes the adjustment of the speed based on the advance angle again.

In step S1004 or step S1008, if the advance angle/power rate control unit 208 determines that the speed has reached the target speed, it ends the process.

Next, the target advance angle/power rate search processing in a case in which the target speed is set in the deceleration direction, that is, the example of step S803 as described above will be explained for each target speed.

Figure 13:
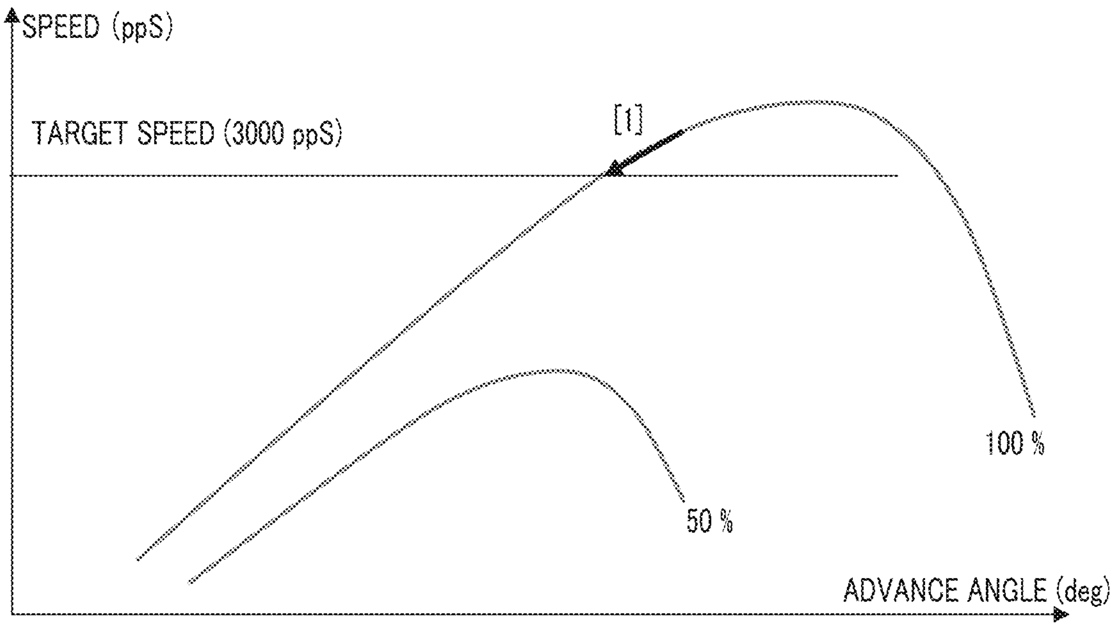
FIG. 13 is a diagram for explaining an example of the target advance angle/power rate search processing in a case in which the target speed is set in a deceleration direction and the target speed is 3000 ppS.
Figure 14:
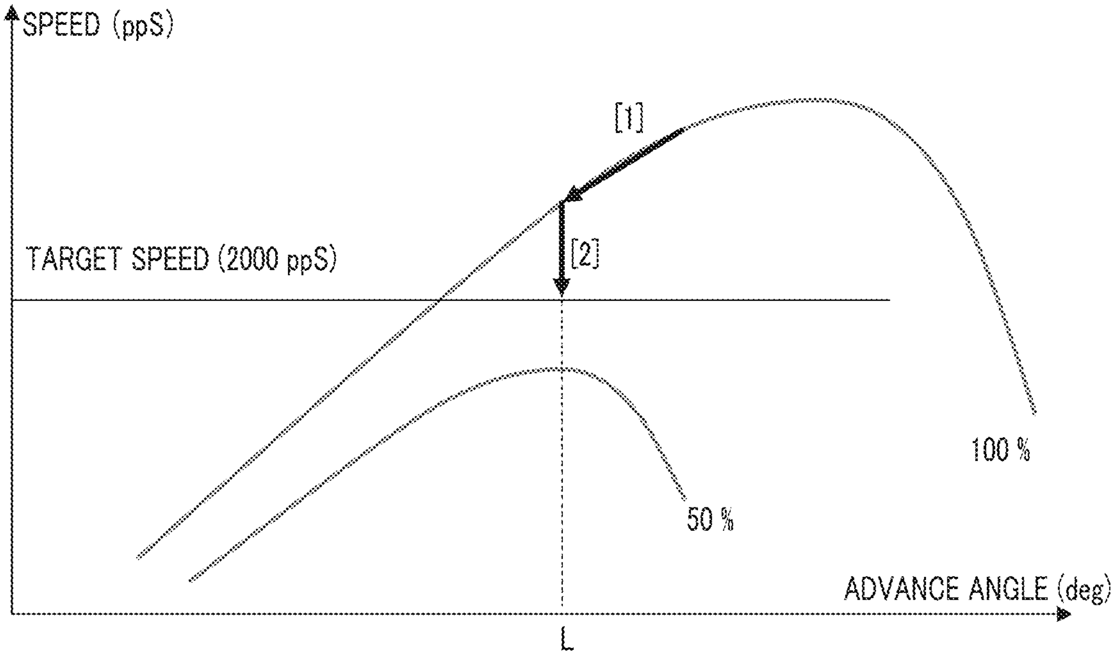
FIG. 14 is a diagram for explaining an example of the target advance angle/power rate search processing in a case in which the target speed is set in a deceleration direction and the target speed is 2000 ppS.

FIG. 13 is a diagram for explaining an example of the target advance angle/power rate search processing in a case in which the target speed is set in the deceleration direction and the target speed is 3000 ppS. FIG. 14 is a diagram for explaining an example of the target advance angle/power rate search processing in a case in which the target speed is set in the deceleration direction and the target speed is 2000 ppS.

Figure 15:
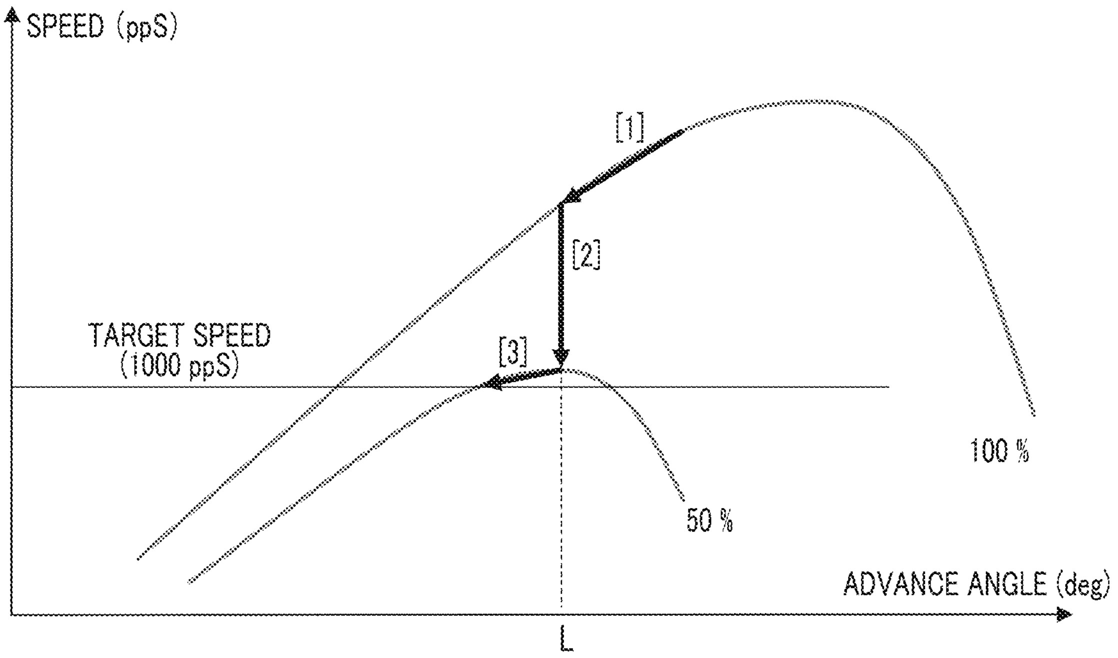
FIG. 15 is a diagram for explaining an example of the target advance angle/power rate search processing in a case in which the target speed is set in a deceleration direction and the target speed is 1000 ppS.

FIG. 15 is a diagram for explaining an example of the target advance angle/power rate search processing in a case in which the target speed is set in the deceleration direction and the target speed is 1000 ppS. Each of FIG. 13, FIG. 14, and FIG. 15 illustrates an example of the relation between an advance angle of the drive waveform for driving the stepping motor 101 and a speed at which the stepping motor 101 rotates. Additionally, the information indicating the relation is stored by, for example, the storage unit for each amplitude of the drive waveform.

For example, if the target speed is 3000 ppS, the speed is decreased by decreasing the advance angle as indicated by [1] in FIG. 13, and the speed is caused to reach 3000 ppS, which is the target speed.

Additionally, for example, if the target speed is 2000 ppS, even if the advance angle is decreased as indicated by [1] in FIG. 14, the speed does not reach the target speed, but the speed reaches the advance angle L that is the advance angle stored during the target advance angle/power rate search processing in a case in which the target speed is set in the acceleration direction.

Next, as indicated by [2] in FIG. 14, the speed is caused to reach the 2000 ppS, which is the target speed, by decreasing the power rate.

Additionally, for example, if the target speed is 1000 ppS, the target speed is not reached even if the advance angle is decreased as indicated by [1] and [2] in FIG. 15, and the speed reaches the advance angle L that gives a saturation point. In this case, as indicated by [3] in FIG. 15, the advance angle is decreased to cause the speed to reach 1000 ppS, which is the target speed.

Figure 16:
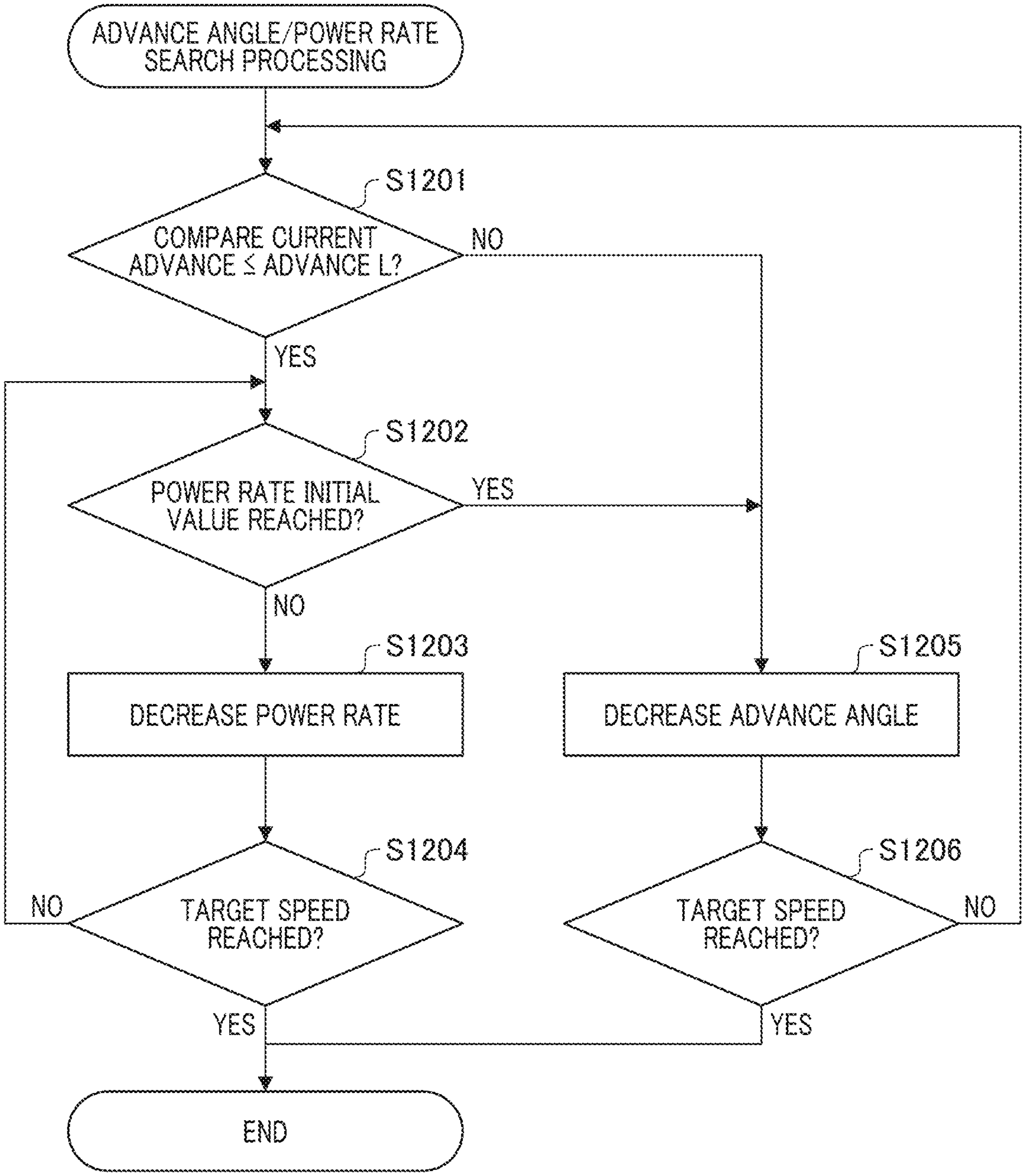
FIG. 16 is a flowchart for explaining an example of the advance angle/power rate search processing explained with reference to FIG. 13 to FIG. 15.

Next, details of the advance angle/power rate search processing explained with reference to FIG. 13 to FIG. 15, that is, step S803 described above will be explained with reference to FIG. 16. FIG. 16 is a flowchart for explaining an example of the advance angle/power rate search processing explained with reference to FIG. 13 to FIG. 15.

In step S1201, the advance angle/power rate control unit 208 compares the current advance angle and the advance angle L. In step S1201, if the advance angle/power rate control unit 208 determines that the current advance angle is greater than the advance angle L, it advances the process to step S1205.

In step S1205, the advance angle/power rate control unit 208 executes the adjustment of the speed based on the advance angle. Specifically, in step S1205, the advance angle/power rate control unit 208 decelerates the speed while updating the advance angle to an advance angle smaller than the previous advance angle, and in step S1206, if the advance angle/power rate control unit 208 determines that the target speed is not reached, it returns the process to step S1201 and repeats the process.

In contrast, if the advance angle/power rate control unit 208 determines that the current advance angle is equal to or less than the advance angle L in step S1201, the advance angle/power rate control unit 133 determines whether or not the power rate has reached 50% which is the initial value in step S1202.

In step S1202, if the advance angle/power rate control unit 208 determines that the power rate has not reached 50% that is the initial value, it advances the process to step S1203. In step S1203, the advance angle/power rate control unit 208 decelerates the speed while decreasing the power rate.

In step S1204, if the advance angle/power rate control unit 208 determines that the speed has not reached the target speed as a result of determining whether or not the speed has reached the target speed, the advance angle/power rate control unit 208 returns the process to step S1202 and repeats the process.

In step S1202, if the advance angle/power rate control unit 208 determines that the power rate has reached 50%, which is the initial value, it advances the process to step S1205. In step S1205, the advance angle/power rate control unit 208 executes the adjustment of the speed based on the advance angle again. In step S1204 or step S1206, if the advance angle/power rate control unit 208 determines that the speed has reached the target speed, it ends the process.

As explained above, in the first embodiment, since the maximum advance angle that can be set is used in view of the amount of change in speed, it is possible to rotate the stepping motor 101 at a high speed while suppressing an increase in voltage.

Second Embodiment

In the first embodiment, a control method of increasing the power rate to 100% to reach the target speed if the target speed has not reached even if the advance angle is adjusted in a state in which the initial power rate is 50% has been explained.

However, in the control method explained in the first embodiment, since the control is performed in a state where the power rate is high depending on the target speed, the efficiency may decrease. Accordingly, in the second embodiment, the advance angle/power rate search processing that enables the target speed to be reached at a lower power rate will be explained.

Figure 17:
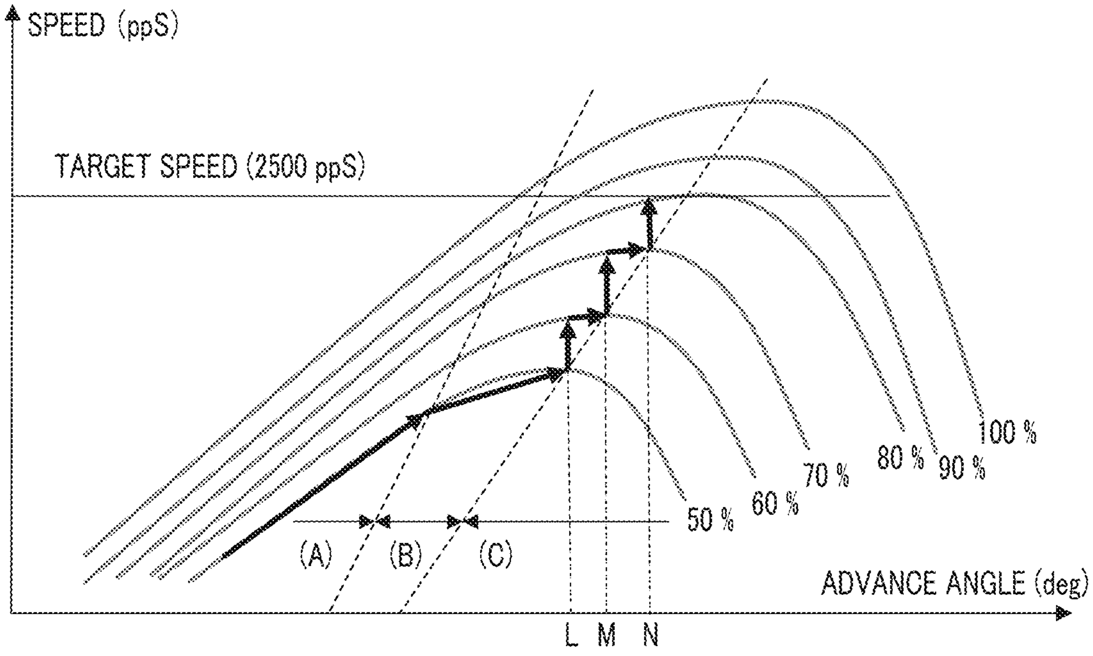
FIG. 17 is a diagram for explaining an example of the target advance angle/power rate search processing in a case in which the target speed is set in an acceleration direction and the target speed is 2500 ppS.

The advance angle/power rate search processing in a case in which the target speed is set in the acceleration direction and the target speed is a 2500 ppS will be explained with reference to FIG. 17. FIG. 17 is a diagram for explaining an example of the target advance angle/power rate search processing in a case in which the target speed is the acceleration direction, and the target speed is 2500 ppS.

Additionally, FIG. 17 illustrates an example of the process in which the increase amount of the power rate is smaller than that of the process explained in the first embodiment. Note that FIG. 17 illustrates an example of the relation between the advance angle of the drive waveform for driving the stepping motor 101 and the rotation speed of the stepping motor 101. Additionally, the information indicating the relation is stored by, for example, the storage unit for each amplitude of the drive waveform.

For example, if the target speed is 2500 ppS as illustrated in FIG. 17, the speed is caused to increase by the control based on the advance angle, as in the first embodiment. Since the target speed has not reached at the time point when the advance angle reaches the advance angle L at which the speed change rate becomes equal to or less than a threshold, the speed is caused to increase by increasing the power rate after the advance angle L is stored.

However, in the second embodiment, it is assumed that the increase amount of the power rate is up to 10%. In the example illustrated in FIG. 17, since the target speed has not reached even after the power rate is increased once, the process corresponding to [3] and [4] illustrated in FIG. 11 is repeated. In the example illustrated in FIG. 17, the speed reaches the target speed at the advance angle N and the power rate 80%.

Figure 18:
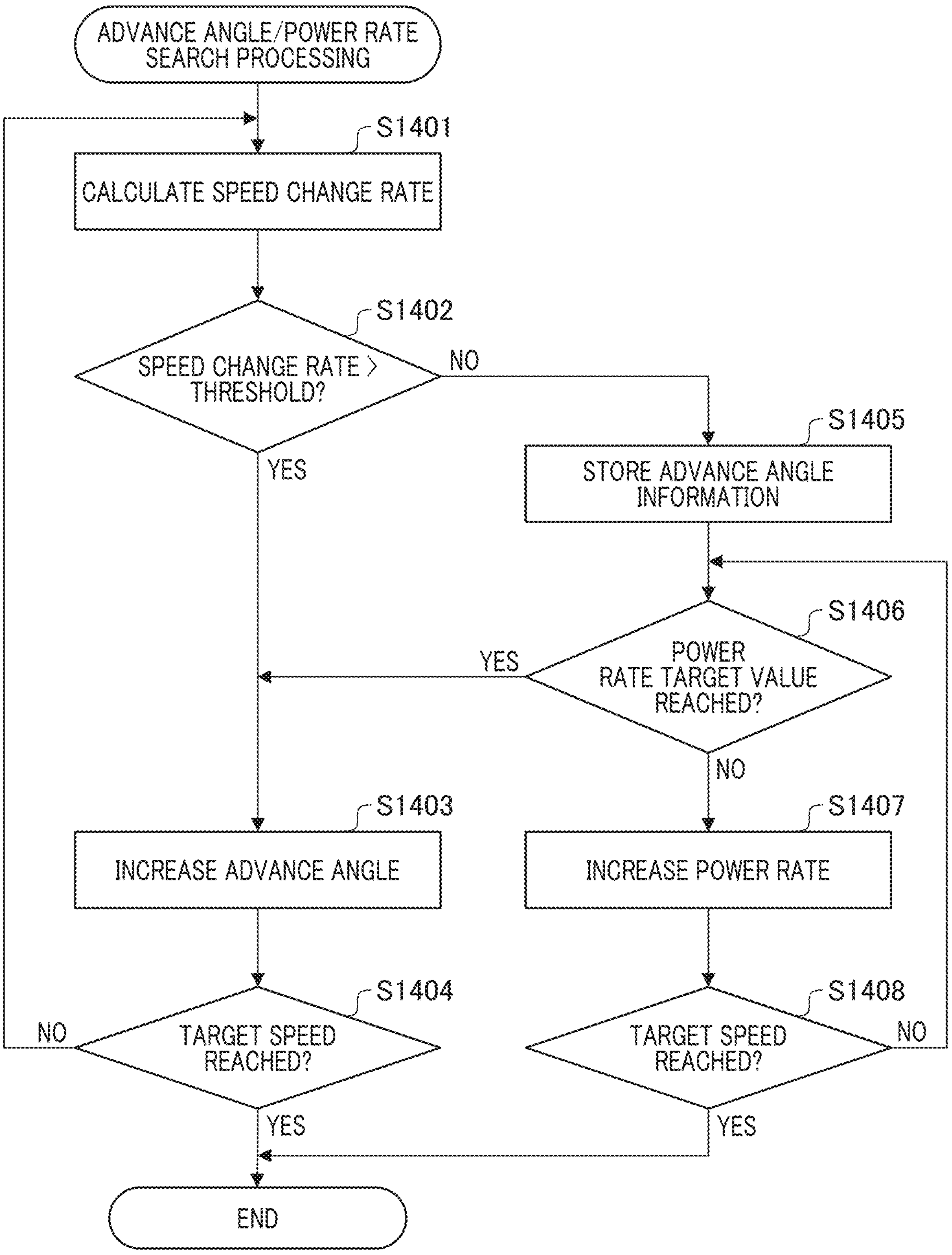
FIG. 18 is a flowchart for explaining an example of the advance angle/power rate search processing explained with reference to FIG. 17.

The target advance angle/power rate search processing explained with reference to FIG. 17 will be explained with reference to the flowchart illustrated in FIG. 18. FIG. 18 is a flowchart for explaining an example of the advance angle/power rate search processing explained with reference to FIG. 17. Note that, in the explanation using FIG. 18, the explanation of the contents overlapping with the contents explained with reference to FIG. 12 will be omitted.

In the second embodiment, in step S1405, the advance angle/power rate control unit 208 stores the power rate at the time point when step S1405 is executed in association with the advance angle, in addition to the advance angle.

In step S1406, the advance angle/power rate control unit 208 determines whether or not the power rate has reached the target value. In step S1406, if the advance angle/power rate control unit 208 determines that the power rate has reached the target value, it advances the process to step S1403.

In contrast, in step S1406, if the advance angle/power rate control unit 208 determines that the power rate has not reached the target value, it advances the process to S1407. Accordingly, the advance angle/power rate control unit 208 updates the power rate by a predetermined value each time step S1405 and step S1406 are executed until the power rate reaches the upper limit of update.

In the second embodiment, the upper limit of the update of the power rate is 100% and the predetermined value is 10%. In step S1404 or step S1408, if the advance angle/power rate control unit 208 determines that the speed has reached the target speed, it ends the process.

Figure 19:
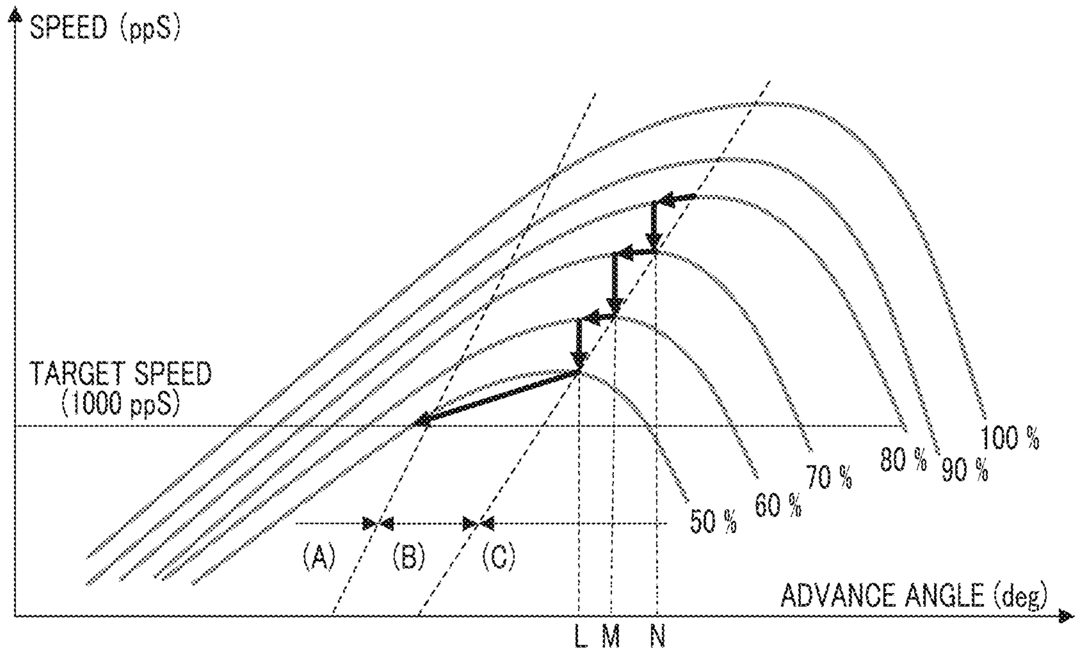
FIG. 19 is a diagram for explaining an example of the target advance angle/power rate search processing in a case in which the target speed is set in a deceleration direction and the target speed is 1000 ppS.

The advance angle/power rate search processing in a case in which the target speed is set in the deceleration direction and the target speed is 1000 ppS will be explained with reference to FIG. 19. FIG. 19 is a diagram for explaining an example of the target advance angle/power rate search processing in a case in which the target speed is set in the deceleration direction and the target speed is 1000 ppS. Additionally, FIG. 19 shows an example of the process in which the amount of decrease in the power rate is smaller than that in the process explained in the first embodiment.

For example, if the target speed is 1000 ppS as illustrated in FIG. 19, the speed is decreased by the control based on the advance angle, as in the first embodiment, and when the advance angle reaches the advance angle N, the control is switched to the control of decreasing the speed based on the power rate to decrease the power rate to 70%.

Since the speed has not reached the target speed even when the power rate is decreased to 70%, the advance angle is decreased, and when the advance angle reaches the advance angle M, the control is switched to the control of decreasing the speed based on the power rate to decrease the power rate to 60%.

Since the speed has not reached the target speed even when the power rate is decreased to 60%, the advance angle is decreased, and when the advance angle reaches the advance angle L, the control is switched to the control of decreasing the speed based on the power rate to decrease the power rate to 50%. Since the speed has not reached the target speed even when the power rate is decreased to 50%, the advance angle is decreased to cause the speed to reach 1000 pps.

Figure 20:
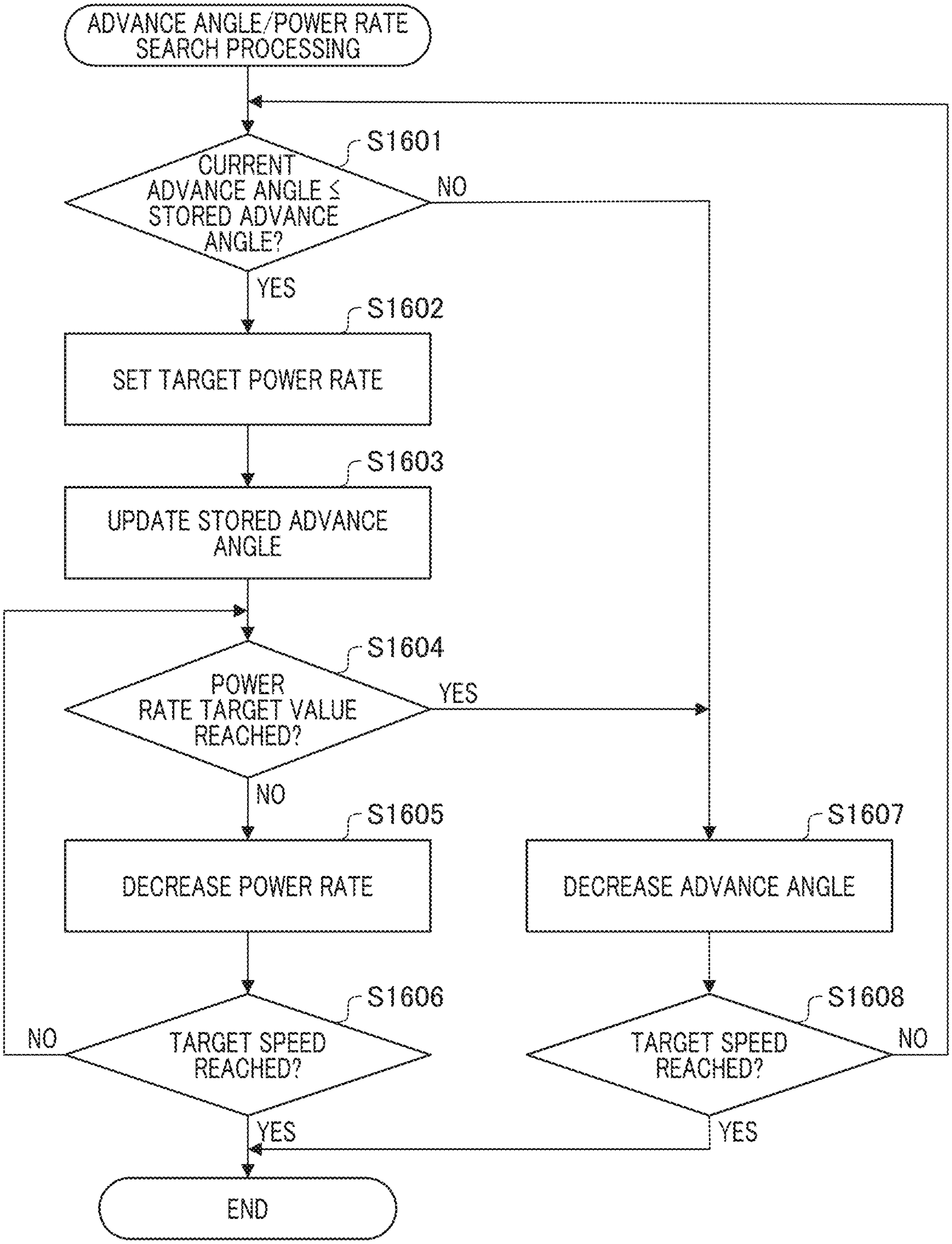
FIG. 20 is a flowchart for explaining an example of the advance angle/power rate search processing explained with reference to FIG. 19.

The target advance angle/power rate search processing explained with reference to FIG. 19 will be explained with reference to the flowchart illustrated in FIG. 20. FIG. 20 is a flowchart for explaining an example of the advance angle/power rate search processing explained with reference to FIG. 19.

Note that FIG. 19 illustrates an example of the relation between the advance angle of the drive waveform for driving the stepping motor 101 and the rotation speed of the stepper motor 101. Additionally, the information indicating the relation is stored by, for example, the storage unit for each amplitude of the drive waveform. Additionally, in the explanation using FIG. 20, the explanation of contents overlapping with the contents explained with reference to FIG. 16 will be omitted.

In step S1601, the advance angle/power rate control unit 208 compares the current advance angle and the advance angle stored at the time of acceleration. Additionally, if there are a plurality of advance angles stored during acceleration, the advance angle/power rate control unit 208 compares the maximum advance angle among the advance angles stored during acceleration and the current advance angle.

If the advance angle/power rate control unit 208 determines that the current advance angle is larger than the advance angle stored during acceleration, it advances the process to step S1607, and decreases the speed by decreasing the advance angle. Then, in step S1608, the advance angle/power rate control unit 208 determines whether or not the speed has reached the target speed.

Specifically, in step S1607, the advance angle/power rate control unit 208 decelerates while updating the advance angle to an advance angle smaller than the previous one, and in step S1608, if the advance angle/power rate control unit 208 determines that the speed has not reached the target speed, it returns the process to step S1601 and repeats the process.

In contrast, if the advance angle/power rate control unit 208 determines that the current advance angle is equal to or smaller than the advance angle stored during acceleration, it advances the process to step S1602, and sets the target value of the power rate. In step S1602, the advance angle/power rate control unit 208 sets the power rate associated with the advance angle that is the target for the comparison in step S1601 executed immediately before, as the target value of the power rate.

Then, the advance angle/power rate control unit 208 deletes information indicating the advance angle to be compared in step S1601 executed immediately before and the power rate associated with the advance angle.

In step S1604, the advance angle/power rate control unit 208 compares the current power rate and the target value of the power rate.

In step S1604, if the advance angle/power rate control unit 208 determines that the current power rate has not reached the target value of the power rate, it advances the process to step S1605.

In step S1605, the advance angle/power rate control unit 208 decreases the speed by decreasing the power rate. In step S1606, the advance angle/power rate control unit 208 determines whether or not the speed has reached the target speed.

In step S1606, if the advance angle/power rate control unit 208 determines that the speed has not reached the target speed, it returns the process to step S1604 and repeats the processes of step S1604 and step S1605.

In contrast, in step S1606, if the advance angle/power rate control unit 208 determines that the speed has reached the target speed, it returns the process to step S1607 again, and in step S1607, it decreases the speed by decreasing the advance angle.

In step S1606 or step S1608, if the advance angle/power rate control unit 208 determines that the speed has reached the target speed, it ends the process.

As explained above, in the second embodiment, the speed is accelerated or decelerated to the target speed while alternately repeating the control of the speed based on the advance angle and the control of the speed based on the power rate.

Therefore, the speed can be controlled by a combination of an efficient advance angle and power rate at all times, and the motor can be rotated at a high speed while suppressing an increase in voltage.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the motor control device and the like through a network or various storage media. Then, a computer (or a CPU, an MPU, or the like) of the motor control device and the like may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

What is claimed is:

1. A motor control device comprising:

at least one processor or circuit configured to function as:

a storage unit configured to store a relation between an advance angle of a drive waveform for driving a motor and a speed at which the motor rotates, for each amplitude of the drive waveform;

a speed detection unit configured to detect a speed of the motor;

a position detection unit configured to detect a position at which the motor has rotated; and a control unit configured to control an advance angle of the drive waveform and an amplitude of the drive waveform based on a cycle or timing in which the position at which the motor has rotated is detected by the position detection unit;

wherein the control unit increase a speed of the motor by executing a first control pattern in which the advance angle of the drive waveform is increased if the speed of the motor detected by the speed detection unit is lower than a target speed, and the amplitude of the drive waveform is increased if a condition that an amount of increase in the speed of the motor resulting from an increase in the advance angle of the drive waveform is equal to or less than a predetermined amount of increase is satisfied.

2. The motor control device according to claim 1, wherein the speed detection unit detects a speed of the motor after the first control pattern is executed, and the control unit executes the first control pattern again if the speed of the motor after the first control pattern is executed is less than the target speed.

3. The motor control device according to claim 1, wherein the control unit increases an advance angle of the drive waveform if a speed of the motor detected by the speed detection unit is lower than a target speed, and then increases an amplitude of the drive waveform if the speed of the motor decreases resulting from an increase in the advance angle of the drive waveform.

4. The motor control device according to claim 1, wherein if the condition is satisfied and a difference between a speed of the motor and the target speed is equal to or greater than a predetermined speed, the control unit increases an amplitude of the drive waveform more than a case where the condition is satisfied and the difference is less than the predetermined speed.

5. The motor control device according to claim 1, wherein the control unit decreases a speed of the motor by executing a second control pattern in which an advance angle of the drive waveform is decreased if a speed of the motor detected by the speed detection unit is higher than a target speed, and an amplitude of the drive waveform is decreased if an amount of decrease in the speed of the motor resulting from the decrease in the advance angle of the drive waveform is equal to or less than a predetermined amount of decrease.

* * * * *